(12) United States Patent
Lee et al.

(10) Patent No.: US 11,817,555 B2
(45) Date of Patent: Nov. 14, 2023

(54) COMPOSITION FOR POLYMER ELECTROLYTE, POLYMER ELECTROLYTE COMPRISING THE SAME, AND METHOD FOR MANUFACTURING POLYMER ELECTROLYTE

(71) Applicant: KOREA INSTITUTE OF ENERGY RESEARCH, Daejeon (KR)

(72) Inventors: Jung-hyun Lee, Daejeon (KR); Jungjoon Yoo, Daejeon (KR); Jeong Hun Baek, Daejeon (KR); Jeong-gu Yeo, Daejeon (KR); Hyun Ju Lim, Daegu (KR); Hye Jin Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 344 days.

(21) Appl. No.: 17/024,905

(22) Filed: Sep. 18, 2020

(65) Prior Publication Data
US 2022/0093968 A1    Mar. 24, 2022

(51) Int. Cl.
*H01M 10/0565* (2010.01)
*H01M 10/0525* (2010.01)
*H01M 10/26* (2006.01)
*H01M 4/04* (2006.01)
*H01M 4/02* (2006.01)

(52) U.S. Cl.
CPC ....... *H01M 10/0565* (2013.01); *H01M 4/049* (2013.01); *H01M 10/0525* (2013.01); *H01M 10/26* (2013.01); *H01M 2004/021* (2013.01); *H01M 2300/0082* (2013.01)

(58) Field of Classification Search
CPC ..... H01M 2300/0082; H01M 10/0565; H01M 2300/0065; H01M 50/411; H01M 50/417; H01M 10/0525; H01M 10/26; C08F 290/141; C08F 12/14; C08F 20/14
See application file for complete search history.

(56) References Cited

U.S. PATENT DOCUMENTS

| | | | |
|---|---|---|---|
| 5,952,126 A * | 9/1999 | Lee | H01M 10/0565 |
| | | | 429/324 |
| 2018/0048020 A1* | 2/2018 | Zou | H01M 4/625 |
| 2018/0048023 A1* | 2/2018 | Ohsawa | H01M 4/139 |
| 2020/0287240 A1* | 9/2020 | Hudak | H01M 10/058 |

(Continued)

FOREIGN PATENT DOCUMENTS

| | | |
|---|---|---|
| JP | 2020-509746 A | 4/2020 |
| KR | 10-2019-0004721 A | 1/2019 |

(Continued)

OTHER PUBLICATIONS

Korean Office Action for KR Application No. 10-2020-0121582 dated Sep. 16, 2021, citing the above reference(s).

*Primary Examiner* — Jeremiah R Smith
(74) *Attorney, Agent, or Firm* — CANTOR COLBURN LLP (57) ABSTRACT

The present disclosure relates to a composition for a polymer electrolyte, a polymer electrolyte comprising the same, and a method for producing the polymer electrolyte, and specifically, to a composition for a polymer electrolyte comprising an ion conductive monomer and a polymerizable comonomer, and a polymer electrolyte comprising the same.

14 Claims, 7 Drawing Sheets

(56) References Cited

U.S. PATENT DOCUMENTS

2020/0328471 A1* 10/2020 D'Angelo ........... H01M 10/052
2022/0173433 A1* 6/2022 Chopra ..................... G02F 1/15

FOREIGN PATENT DOCUMENTS

| KR | 10-2019-0085355 A | 7/2019 | | |
|----|-------------------|--------|---|---|
| KR | 10-2020-0046795 A | 5/2020 | | |
| KR | 20200046795 | * | 5/2020 | ........ H01M 10/0565 |

* cited by examiner

COMPOSITION FOR POLYMER ELECTROLYTE, POLYMER ELECTROLYTE COMPRISING THE SAME, AND METHOD FOR MANUFACTURING POLYMER ELECTROLYTE

BACKGROUND

1. Technical Field

The present disclosure relates to a composition for a polymer electrolyte, a polymer electrolyte comprising the same, and a method for producing the polymer electrolyte, and more particularly, to a composition for a polymer electrolyte comprising an ion conductive monomer and a polymerizable comonomer, a polymer electrolyte comprising the same, a method for producing the polymer electrolyte, and an electronic device comprising the polymer electrolyte.

2. Related Art

A supercapacitor is a device that uses the storage of charge in an electric double layer formed at the interface between a solid electrode and an electrolyte. The supercapacitor has a low energy density compared to conventional batteries, but has excellent characteristics in terms of power density for instantaneous energy supply and has an almost semi-permanent life. Thus, the supercapacitor is expected to be applied as an ultra-high capacity battery in various fields. In particular, in recent years, the supercapacitor has been actively applied to load leveling, etc. in combination with a secondary battery as an auxiliary power source for an environmentally friendly hybrid electric vehicle.

The supercapacitor is characterized in that it shows a weight energy density corresponding to about 1/2 to 1/10 of a secondary battery depending on the characteristics of the electrode active material, and the power density indicating the charge/discharge capability thereof is at least 100 times higher than those of conventional batteries.

The supercapacitor is composed of electrodes (cathode and anode), an electrolyte, a separator, a current collector, a case, a terminal, etc. Thus, when a pair of solid electrodes is placed in an electrolyte ion solution and a DC voltage is applied across the electrodes, anions are electrostatically attracted to the positively polarized electrode and cations are electrostatically attracted to the negatively polarized electrode, thus forming an electric double layer at the interface between the electrodes and the electrolyte. In particular, when activated carbon is used as an electrode, the area of the electric double layer can increase due to a large number of fine pores distributed in the activated carbon, so that large capacity can be achieved. In this case, the electrolyte plays an important role together with the electrodes, and the electrolyte directly comprises ions that form the electric double layer.

Meanwhile, electrolytes that are used in the supercapacitor are roughly classified into an aqueous electrolyte and an organic electrolyte. Although the aqueous electrolyte has the advantage of having high ionic conductivity, it comprises water as a solvent, and thus is electrochemically stable only when it is used at 1.24 V or less, which is the decomposition voltage of water. For this reason, the aqueous electrolyte has a narrow operating voltage range, and thus the fabrication of a supercapacitor with high energy density using the aqueous electrolyte is limited. On the other hand, the organic electrolyte has a disadvantage in that the ionic conductivity thereof is lower than that of the aqueous electrolyte, but the organic electrolyte has the advantage of having a wide potential window because the organic solvent itself is electrochemically stable. Thus, the organic electrolyte advantageously makes it possible to fabricate a high-energy-density supercapacitor. Representative examples of the organic electrolyte comprise quaternary ammonium salt-containing acetonitrile (ACN) or propylene carbonate (PC).

However, most of the electrolytes that have been studied so far have a fundamental disadvantage in that they undergo volatilization at room temperature due to the vapor pressure of the solvent. In addition, a liquid electrolyte has the advantage of having relatively high ionic conductivity compared to a solid or gel electrolyte, but has disadvantages in terms of securing safety against leakage between electrodes, deterioration in life characteristics during charge/discharge cycles, overcharge and misuse. In addition, the liquid electrolyte is disadvantageous in terms of the design and shape flexibility of the supercapacitor.

Accordingly, the present inventors have conducted studies in order to solve the above-described problems. As a result, the present inventors have developed a polymer electrolyte comprising a crosslinked polymer of an ion conductive monomer and a polymerizable comonomer in an ionic liquid comprising no solvent, and have found the applicability of the polymer electrolyte to a supercapacitor or a secondary battery, thereby completing the present disclosure.

SUMMARY

The present disclosure has been made in order to solve the above-described problems, and one embodiment of the present disclosure provides a composition for a polymer electrolyte comprising: an ionic conductive monomer; and a polymerizable comonomer.

Another embodiment of the present disclosure provides a polymer electrolyte comprising a product of crosslinking polymerization of the composition for a polymer electrolyte.

Still another embodiment of the present disclosure provides a method for producing a polymer electrolyte, the method comprising a step of subjecting the composition for a polymer electrolyte to solvent-free crosslinking polymerization using 3D printing.

Yet another embodiment of the present disclosure provides an electronic device comprising the polymer electrolyte produced according to the method.

The technical problems to be achieved by the present disclosure are not limited to the above-mentioned technical problems, and other technical problems that are not mentioned will be clearly understood by those skilled in the technical field to which the present disclosure pertains from the following description.

To achieve the above-described technical problems, one aspect of the present disclosure provides a composition for a polymer electrolyte comprising: an ion conductive monomer; and a polymerizable comonomer.

The ion conductive monomer may comprise a polymerizable group and an ionic functional group, in which the ionic functional group may comprise a tetravalent nitrogen functional group and an ionic salt which is an isomerization product of an inorganic acid.

The ion conductive monomer may be a compound of the following Formula 1 or 2:

[Formula 1]

wherein m and n are each an integer ranging from 1 to 10; $R_1$ is hydrogen, a straight or branched-chain $C_1$-$C_{10}$ alkyl, or a straight or branched-chain $C_2$-$C_{10}$ alkenyl; $R_2$ is nitrogen or oxygen; and $R_3$ is a straight or branched-chain $C_1$-$C_{10}$ alkyl or a straight or branched-chain $C_2$-$C_{10}$ alkenyl;

[Formula 2]

wherein m and n are each an integer ranging from 1 to 10; $R_1$ is hydrogen, a straight or branched-chain $C_1$-$C_{10}$ alkyl, or a straight or branched-chain $C_2$-$C_{10}$ alkenyl; $R_2$ is nitrogen or oxygen; and $R_3$ is a straight or branched-chain $C_1$-$C_{10}$ alkyl or a straight or branched-chain $C_2$-$C_{10}$ alkenyl.

The polymerizable group of the ion conductive monomer may be a vinyl polymerizable group or acrylate polymerizable group.

The ion conductive monomer may be sulfobetaine methacrylate (SBMA) or 2-methacryloyloxyethyl phosphorylcholine (MPC).

The polymerizable comonomer may comprise a diacrylate-based comonomer, a triacrylate-based comonomer, a methacrylate-based comonomer, a vinyl-based comonomer, an olefin-based comonomer a bifunctional thiol-terminated polythioether comonomer, a trifunctional thiol-terminated polythioether comonomer, or a combination of two or more thereof.

The polymerizable comonomer may comprise a poly(ethylene glycol) diacrylate-based comonomer, a poly(ethylene glycol) triacrylate-based comonomer, a difunctional thiol-terminated polythioether comonomer, a trifunctional thiol-terminated polythioether comonomer, or a combination of two or more thereof.

The polymerizable comonomer may comprise a poly(ethylene glycol) diacrylate-based comonomer represented by the following Formula 3, a poly(ethylene glycol) triacrylate-based comonomer represented by the following Formula 4, a thiol-terminated polythioether comonomer represented by the following Formula 5, or a combination of two or more thereof:

[Formula 3]

PEGDA(700)

[Formula 4]

MPEGTA

[Formula 5]

In Formula 3 or 4 above, n may be an integer of 1 or more. n in Formula 3 may be an integer ranging from 2 to 15, and n in Formula 4 may be an integer ranging from 1 to 10.

The composition for a polymer electrolyte may further comprise an ionic liquid.

The ionic liquid may comprise an anionic liquid selected from the group consisting of trifluoroacetate ([tfa]$^-$), trifluoromethanesulfonate ([CF$_2$SO$_3$]$^-$), bis(fluorosulfonyl)imide ([N(SO$_2$F)$_2$]$^-$), bis(trifluoromethanesulfonyl)imide ([N(SO$_2$CF$_3$)$_2$]$^-$), dicyanamide ([N(CN)$_2$]$^-$), tetracyanoborate ([B(CN)$_4$]$^-$), dihydrogen phosphate ([H$_2$PO$_4$]$^-$), hydrogen sulfate [HSO$_4$]$^-$), and combinations thereof; or a cationic liquid selected from the group consisting of imidazolium, pyrrolidinium, piperidinium alkylmethylimidazolium, and combinations thereof; or a neutral liquid selected from the group consisting of 1-ethyl-3-methylimidazolium bis(trifluoromethylsulfonyl)imide (EMITFSI), 1-methyl-3-propylimidazolium iodide (PMII), 1-ethyl-3-methylimidazolium tetrafluoroborate (EMIBF$_4$), 1-ethyl-3-methylimidazolium trifluoromethanesulfonate (EMITf), 1-ethyl-3-methylimidazolium hydrogen sulfate (EMIHSO$_4$), 1-ethyl-3-methylimidazolium trifluoromethanesulfonate (EMITf), N-methyl-N-butylpyrrolidinium bis(trifluoromethanesulfonyl)imide (PYRTFSI), and combinations thereof.

The composition for a polymer electrolyte may further comprise an alkali metal salt.

The alkali metal salt may comprise LiPF$_6$, LiBF$_4$, LiSbF$_6$, LiAsF$_6$, LiN (SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$) (C$_y$F$_{2y+1}$SO$_2$) (where x and y are each a natural number), LiCl, LiI, LiB(C$_2$O$_4$)$_2$, lithium bisoxalatoborate (LiBOB), lithium bis(trifluoromethanesulfonyl)imide (LiTFSI), lithium bis(fluorosulfonyl)imide (LiFSI), NaSCN, NaSO$_3$CF$_3$, KTFSI, NaTFSI, or a combination of two or more thereof.

The composition for a polymer electrolyte may further comprise at least one additive selected from the group consisting of succinonitrile (SN), polyethyleneglycol dimethylene ether (PEGDME), and polyethylene glycol (PEG).

The composition for a polymer electrolyte may comprise, 8 to 50 mol % of the ion conductive monomer, 1 to 60 mol % of the polymerizable comonomer, 7 to 40 mol % of the alkali metal salt, if comprised, 5 to 70 mol % of the ionic liquid, if comprised, and 0 to 50 mol % of the additive, with respect to 100 mol % of the composition for a polymer electrolyte.

Another aspect of the present disclosure provides a polymer electrolyte comprising a product of crosslinking polymerization of the composition for a polymer electrolyte.

The product of crosslinking polymerization may have an ionic conductivity of $10^{-3}$ S/cm to $10^{-2}$ S/cm.

Still another aspect of the present disclosure provides a method for producing a polymer electrolyte, the method comprising a step of subjecting the composition for a polymer electrolyte to solvent-free crosslinking polymerization reaction using 3D printing.

The step of subjecting the composition for a polymer electrolyte to solvent-free crosslinking polymerization reaction using 3D printer may be crosslinking polymerizing by penetrating the composition for a polymer electrolyte into a porous electrode material.

Yet another aspect of the present disclosure provides an electronic device comprising the polymer electrolyte produced according to the above-described production method, the electronic device being a supercapacitor, a lithium secondary battery, or an alkaline battery.

DESCRIPTION OF SPECIFIC EMBODIMENTS

Hereinafter, the present disclosure will be described in more detail. However, the present disclosure may be embodied in various different forms and is not limited by the embodiments described herein, and the scope of the present disclosure is defined only by the appended claims.

In addition, the terms used in the present disclosure are used only to describe specific embodiments, and are not intended to limit the present disclosure. Singular expressions comprise plural expressions unless the context clearly indicates otherwise.

Throughout the present disclosure, "comprising" any component means that other components are not excluded, but may be further comprised, unless otherwise particularly specified.

A first aspect of the present disclosure provides a composition for a polymer electrolyte comprising: an ion conductive monomer; and a polymerizable comonomer.

Hereinafter, the composition for a polymer electrolyte according to the first embodiment of the present disclosure will be described in detail.

In one embodiment of the present disclosure, the ion conductive monomer may comprise a polymerizable group and an ionic functional group. The ionic functional group may comprise a tetravalent nitrogen functional group and an ionic salt which is an isomerization product of an inorganic acid.

In one embodiment of the present disclosure, the tetravalent nitrogen functional group may preferably comprise an ammonium group, an imidazolium group, or a pyrrolidinium group, and the ionic salt, which is an isomerization product of an inorganic acid, may be a carboxylate group, a phosphate group, or a sulfonate group.

In one embodiment of the present disclosure, the polymerizable group of the ion conductive monomer is not limited in the kind thereof as long as it may be crosslink-polymerized with the polymerizable comonomer, but the polymerizable group may preferably be a vinyl polymerizable group or acrylate polymerizable group.

Specifically, the ion conductive monomer may be a compound of the following Formula 1 or 2:

[Formula 1]

wherein
m and n are each an integer ranging from 1 to 10; $R_1$ is hydrogen, a straight or branched-chain $C_1$-$C_{10}$ alkyl, or a straight or branched-chain $C_2$-$C_{10}$ alkenyl; $R_2$ is nitrogen or oxygen; and $R_3$ is a straight or branched-chain $C_1$-$C_{10}$ alkyl or a straight or branched-chain $C_2$-$C_{10}$ alkenyl;

[Formula 2]

wherein
m and n are each an integer ranging from 1 to 10; $R_1$ is hydrogen, a straight or branched-chain $C_1$-$C_{10}$ alkyl, or a straight or branched-chain $C_2$-$C_{10}$ alkenyl; $R_2$ is nitrogen or oxygen; and $R_3$ is a straight or branched-chain $C_1$-$C_{10}$ alkyl or a straight or branched-chain $C_2$-$C_{10}$ alkenyl.

Preferably, in Formula 1 or 2 above, m and n may each be an integer ranging from 1 to 5, $R_1$ may be hydrogen, a straight or branched-chain $C_1$-$C_5$ alkyl or a straight or branched-chain $C_2$-$C_5$ alkenyl, and $R_3$ may be a straight or branched-chain $C_1$-$C_5$ alkyl or a straight or branched-chain $C_2$-$C_5$ alkenyl. More preferably, the ion conductive monomer may comprise a monomer selected from the group consisting of sulfobetaine methacrylate (SBMA), carboxybetaine methacrylate (CBMA), carboxybetaine acrylamide (CBAA), 2-methacryloyloxyethyl phosphorylcholine (MPC), and combinations thereof.

In one embodiment of the present disclosure, the composition for a polymer electrolyte may comprise a polymerizable comonomer. The polymerizable comonomer may be crosslink-polymerized with the polymerizable group of the ion conductive monomer, and crosslinking polymerization between polymerizable comonomers may occur. The polymerizable comonomer may comprise a diacrylate-based comonomer, a triacrylate-based comonomer, a methacrylate-based comonomer, a vinyl-based comonomer, an olefin-based comonomer a bifunctional thiol-terminated polythioether comonomer, a trifunctional thiol-terminated polythioether comonomer, or a combination of two or more thereof. Preferably, the polymerizable comonomer may comprise a poly(ethylene glycol) diacrylate-based comonomer, poly(ethylene glycol) triacrylate-based comonomer, or a combination thereof.

Specifically, the polymerizable comonomer may comprise a poly(ethylene glycol) diacrylate-based comonomer represented by the following Formula 3, a poly(ethylene glycol) triacrylate-based comonomer represented by the following Formula 4, or a combination thereof:

[Formula 3]

PEGDA(700)

[Formula 4]

MPEGTA wherein n may be an integer of 1 or more.

In one embodiment of the present disclosure, n in Formula 3 may be an integer ranging from 2 to 15, and n in Formula 4 may be an integer ranging from 1 to 10.

Figure 3:
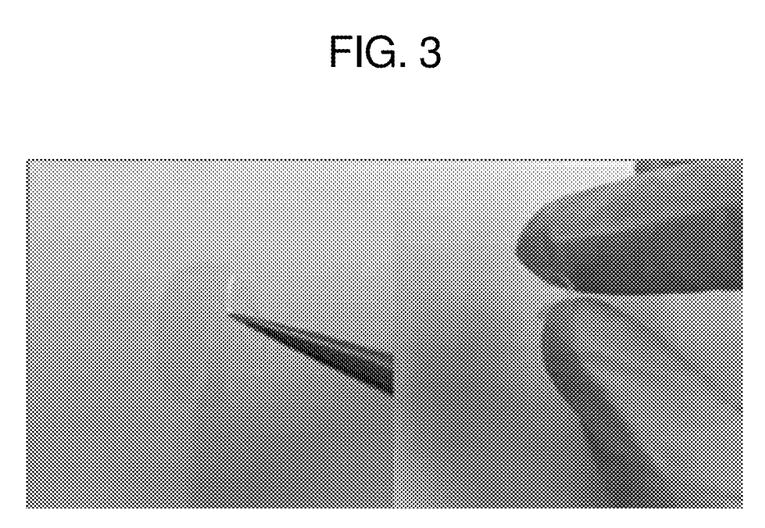
FIGS. 3 and 4 are photographs of a polymer electrolyte produced according to one embodiment of the present disclosure.
Figure 4:
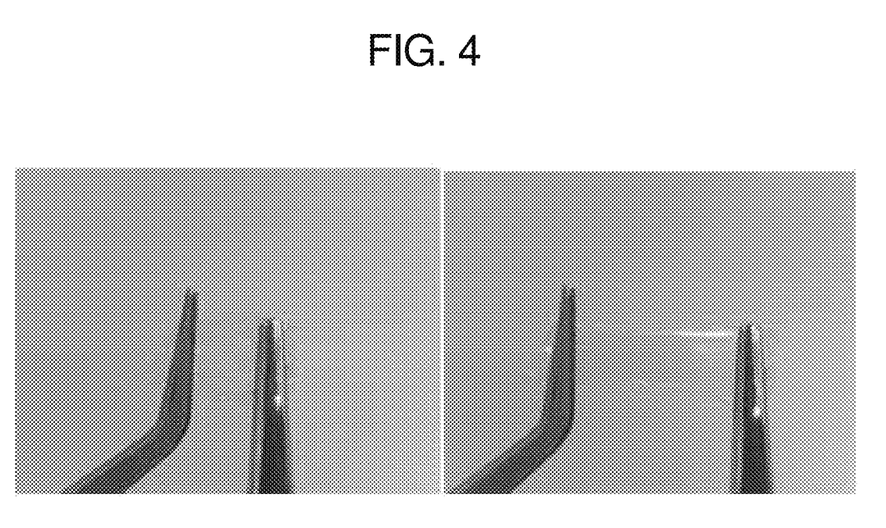

In one embodiment of the present disclosure, the content of the polymerizable comonomer may be 1 to 50 mol %, preferably 1 to 20 mol %, based on 100 mol % of the composition. If the content of the polymerizable comonomer is excessively low, problems may arise in that the mechanical properties of the solid electrolyte deteriorate, and the electrolyte is not solidified or an additive leaks out, and an expandable/shrinkable or bendable film-type electrolyte as shown in FIG. 3 or 4 is not formed. If the content of the polymerizable comonomer is excessively high, problems may arise in that a solid film made of the solid electrolyte is excessively brittle or has low bendability, or the ionic conductivity thereof may be lowered such that the solid film is difficult to function as an electrolyte.

In one embodiment of the present disclosure, the composition for a polymer electrolyte may further comprise an ionic liquid. The ionic liquid refers to an ion-containing liquid, and may comprise, for example, an ionic liquid, a cationic liquid or a neutral liquid.

In one embodiment of the present disclosure, the anionic liquid may comprise an anionic liquid selected from the group consisting of trifluoroacetate ([tfa]$^-$) trifluoromethanesulfonate ([CF$_3$SO$_3$]$^-$), bis(fluorosulfonyl)imide ([N(SO$_2$F)$_2$]$^-$), bis(trifluoromethanesulfonyl)imide ([N(SO$_2$CF$_3$)$_2$]$^-$), dicyanamide ([N(CN)$_2$]$^-$), tetracyanoborate ([B(CN)$_4$]$^-$), dihydrogen phosphate ([H$_2$PO$_4$]$^-$), hydrogen sulfate [HSO$_4$]$^-$), and combinations thereof.

In one embodiment of the present disclosure, the cationic liquid may comprise a cationic liquid selected from the group consisting of imidazolium, pyrrolidinium, piperidinium alkylmethylimidazolium, and combinations thereof.

In one embodiment of the present disclosure, the neutral liquid may comprise a neutral liquid selected from the group consisting of 1-ethyl-3-methylimidazolium bis(trifluoromethylsulfonyl)imide (EMITFSI), 1-methyl-3-propylimidazolium iodide (PMII), 1-ethyl-3-methylimidazolium tetrafluoroborate (EMIBF$_4$), 1-ethyl-3-methylimidazolium trifluoromethanesulfonate (EMITf), 1-ethyl-3-methylimidazolium hydrogen sulfate (EMIHSO$_4$), 1-ethyl-3-methylimidazolium trifluoromethanesulfonate (EMITf), N-methyl-N-butylpyrrolidinium bis(trifluoromethanesulfonyl)imide (PYRTFSI), and combinations thereof.

In one embodiment of the present disclosure, the composition for a polymer electrolyte may further comprise an alkali metal salt. Preferably, the alkali metal salt comprise LiPF$_6$, LiBF$_4$, LiSbF$_6$, LiAsF$_6$, LiN(SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (where x and y are each a natural number), LiCl, LiI, LiB(C$_2$O$_4$)$_2$, lithium bisoxalatoborate (LiBOB), lithium bis(trifluoromethanesulfonyl)imide (LiTFSI), lithium bis(fluorosulfonyl)imide (LiFSI), NaSCN, NaSO$_3$CF$_3$, KTFSI, NaTFSI, or a combination of two or more thereof.

In one embodiment of the present disclosure, the composition for a polymer electrolyte may not further comprise a solvent, particularly water. That is, since the composition for a polymer electrolyte comprises a polymer obtained by performing crosslinking polymerization without a separate solvent, it may have high resistance to water. Thus, the polymer electrolyte may have a wide potential window of 1.24 V or more.

In one embodiment of the present disclosure, the composition for a polymer electrolyte may further comprise an additive, if necessary. As a non-limiting example, the additive is a substance capable of contributing to improving the flexibility or ionic conductivity of the polymer electrolyte, and comprises at least one selected from the group consisting of succinonitrile (SN), polyethyleneglycol dimethylene ether (PEGDME), and polyethylene glycol (PEG).

In one embodiment of the present disclosure, the ion conductive monomer may be comprised in an amount of 2.5 mol % or more, preferably 5 mol % or more, more preferably 8 mol % or more, even more preferably 10 mol % or more, still even more preferably 15 mol % or more, based on 100 mol % of the composition for a polymer electrolyte. In addition, the ion conductive monomer may be comprised in an amount of 55 mol % or less, preferably 50 mol % or less, more preferably 45 mol % or less, even more preferably 40 mol % or less, still even more preferably 35 mol % or less, based on 100 mol % of the composition for a polymer electrolyte. If the ion conductive monomer is comprised in an amount of less than 2.5 mol %, it may be difficult to produce the polymer electrolyte in the form of a film, and if the ion conductive monomer is comprised in an amount of more than 55 mol %, a phenomenon may occur in which the ion conductive monomer does not dissolve in the ionic liquid.

In one embodiment of the present disclosure, the polymerizable comonomer may be comprised in an amount of more than 0 mol %, preferably 0.5 mol % or more, more preferably 1 mol % or more, even more preferably 1.5 mol % or more, still even more preferably 3 mol % or more, based on 100 mol % of the composition for a polymer electrolyte. In addition, the polymerizable comonomer may be comprised in an amount of 56 mol % or less, preferably 50 mol % or less, more preferably 48 mol % or less, even more preferably 45 mol % or less, still even more preferably 40 mol % or less, based on 100 mol % of the composition for a polymer electrolyte. If the polymerizable comonomer is comprised in an amount of less than 0.5 mol %, the stretchability of the polymer electrolyte may decrease, and thus the polymer electrolyte may be likely to be torn, and if the polymerizable comonomer is comprised in an amount of more than 56 mol %, the ionic conductivity of the polymer electrolyte may decrease.

In one embodiment of the present disclosure, when the alkali metal salt is comprised, it may be comprised in an amount of 7 mol % or more, preferably 8 mol % or more, more preferably 9 mol % or more, even more preferably 10 mol % or more, still even more preferably 11 mol % or more, based on 100 mol % of the composition for a polymer electrolyte. In addition, the alkali metal salt may be comprised in an amount of 40 mol % or less, preferably 35 mol % or less, more preferably 30 mol % or less, even more preferably 28 mol % or less, still even more preferably 25 mol % or less, based on 100 mol % of the composition for a polymer electrolyte. If the alkali metal salt is comprised in an amount of less than 7 mol %, the ionic conductivity of the polymer electrolyte may decrease, and if the alkali metal salt is comprised in an amount of more than 40 mol %, the alkali metal salt may not dissolve in the monomer solution, or the viscosity of the solution may increase and a large amount of bubbles may be generated, making it difficult to produce the electrolyte. In one embodiment of the present disclosure, the alkali metal salt may not be comprised depending on the intended use and necessity of the electrolyte.

In one embodiment of the present disclosure, when the ionic liquid is comprised, it may be comprised in an amount of 5 mol % or more, preferably 10 mol % or more, more preferably 15 mol % or more, even more preferably 20 mol % or more, still even more preferably 25 mol % or more, based on 100 mol % of the composition for a polymer electrolyte. In addition, the ionic liquid may be comprised in an amount of 80 mol % or less, preferably 75 mol % or less, more preferably 60 mol % or less, based on 100 mol % of the composition for a polymer electrolyte. If the content of the ionic liquid is excessively low, a problem may arise in that, since the content of the ionic liquid is relatively low, an unreacted ion conductive monomer remains in the polymer electrolyte after the crosslinking polymerization to be described later. On the other hand, if the content of the ionic liquid is excessively high, a problem may arise in that, since the content of the ionic liquid is relatively high and the content of the ionic liquid in the produced polymer electrolyte is high, the electrochemical performance of a supercapacitor or secondary battery comprising the produced polymer solid electrolyte is lowered. In one embodiment of the present disclosure, the ionic liquid may not be comprised depending on the intended use and necessity of the electrolyte.

In one embodiment of the present disclosure, when the additive is comprised, it may be comprised in an amount of more than 0 mol %, preferably 3 mol % or more, more preferably 5 mol % or more, even more preferably 7 mol % or more, still even more preferably 10 mol % or more, based on 100 mol % of the composition for a polymer electrolyte, and may be comprised in an amount of 50 mol % or less, preferably 45 mol % or less, more preferably 40 mol % or less, even more preferably 35 mol % or less, still even more preferably 30 mol % or less.

A second aspect of the present disclosure provides a polymer electrolyte comprising a product of crosslinking polymerization of the composition for a polymer electrolyte.

Although the detailed description of portions overlapping with those in the first aspect of the present disclosure is omitted, the contents described with respect to the first aspect of the present disclosure may be equally applied to the second embodiment even if the description thereof is omitted in the second aspect.

Hereinafter, the polymer electrolyte according to the second aspect of the present disclosure will be described in detail.

In one embodiment of the present disclosure, the ionic conductivity of the product of crosslinking polymerization may be $10^{-3}$ S/cm to $10^{-2}$ S/cm. When this ionic conductivity range is satisfied, the product of crosslinking polymerization has a commercially applicable level of ionic conductivity suitable for a polymer electrolyte, and thus it may be used in an energy storage device.

A third aspect of the present disclosure provides a method for producing a polymer electrolyte, the method comprising a step of subjecting the composition for a polymer electrolyte to solvent-free crosslinking polymerization using 3D printing.

Although the detailed description of portions overlapping with those in the first aspect and second aspect of the present disclosure is omitted, the contents described with respect to the first aspect and second aspect of the present disclosure may be equally applied to the third embodiment even if the description thereof is omitted in the third aspect.

Hereinafter, the method for producing a polymer electrolyte according to the third aspect of the present disclosure will be described in detail.

Figure 1:
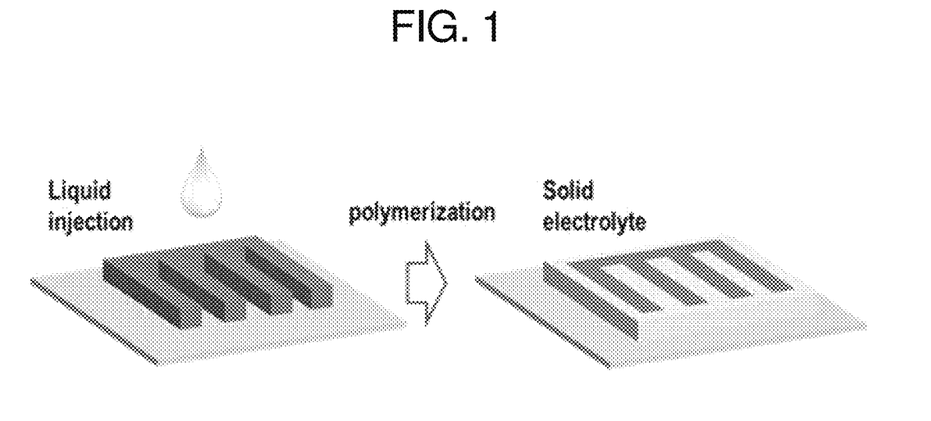
FIG. 1 is a schematic view showing a 3D printing process of introducing a polymer electrolyte into a 3D electrode according to one embodiment of the present disclosure.

In one embodiment of the present disclosure, the step of subjecting the composition for a polymer electrolyte to solvent-free crosslinking polymerization using 3D printing may be performed by subjecting the composition for a polymer electrolyte to crosslinking polymerization after penetration of the composition for a polymer electrolyte into a porous electrode material. The polymer electrolyte may be used as an electrolyte for a supercapacitor or a secondary battery. In particular, since the polymer electrolyte is produced from the mixture of the ion conductive monomer and the polymerizable comonomer by crosslinking polymerization, it may be used as an electrolyte for a supercapacitor or secondary battery comprising an electrode having a complex shape. FIG. 1 shows a schematic view of a 3D printing process for this step. Referring to FIG. 1, the polymer electrolyte is produced by injecting the composition for a polymer electrolyte into a 3D electrode having an uneven shape and crosslinking the composition, and thus a compact solid electrolyte may be produced in the electrode. However, since the schematic diagram of FIG. 1 is for one embodiment of the present disclosure, the shapes of the electrode and the polymer electrolyte are not limited thereto, and various shapes of electrodes and polymer electrolytes may be possible. Meanwhile, since the polymer electrolyte is in a solid form, leakage of the electrolyte therefrom may be prevented, and the polymer electrolyte may have excellent flexibility and stretchability. In addition, since the solid electrolyte is produced without using a separate solvent such as water, a supercapacitor or secondary battery comprising the same may have a wide potential window of 1.24 V or more, preferably 3 V or more, and may have a high capacity.

In one embodiment of the present disclosure, the cross-linking polymerization may comprise steps of: polymerizing the ion conductive monomer with the polymerizable comonomer at room temperature to obtain a polymer; and stirring the polymer at a temperature of 20° C. to 100° C. for 1 minute or more. Preferably, the polymerization step may be performed at room temperature for 30 minutes or more. Meanwhile, if the polymer is stirred at a temperature lower than 30° C. in the stirring step, a problem may arise in that the ion conductive monomer is not dissolved, and if the polymer is stirred at a temperature higher than 100° C., a problem may arise in that the ion conductive monomer solution is solidified or gelled. The stirring temperature and the stirring time are non-limiting examples, and may be adjusted to appropriate levels for forming the polymer electrolyte.

A fourth aspect of the present disclosure provides an electronic device comprising the polymer electrolyte produced according to the above-described production method, the electronic device being a supercapacitor, a lithium secondary battery, or an alkaline battery.

Although the detailed description of portions overlapping with those in the first to third aspects of the present disclosure is omitted, the contents described with respect to the first to third aspects of the present disclosure may be equally applied to the fourth embodiment even if the description thereof is omitted in the fourth aspect.

Hereinafter, the present disclosure will be described in detail with reference to examples so that it can be easily carried out by those skilled in the art. However, the present disclosure may be embodied in various different forms and is not limited to the examples described herein.

EXAMPLE 1

Production of Polymer Solid Electrolyte for Supercapacitor and Test for Flexibility and Stretchability First, in order to produce a polymer solid electrolyte for a supercapacitor, 2-methacryloyloxyethyl phosphorylcholine (MPC) or sulfobetaine methacrylate (SBMA) as an ion conductive monomer and 1-ethyl-3-methylimidazolium bis(trifluoromethylsulfonyl)imide (EMITFSI) as an ionic liquid were mixed together at a weight ratio of 35:65 at room temperature for 30 minutes or less. Then, the mixture was stirred at 70° C. for 30 minutes or less for crosslinking polymerization to produce a polymer electrolyte. FIGS. 3 and 4 show photographs of the polymer electrolyte produced as described above, and it was confirmed that the polymer electrolyte had excellent flexibility and stretchability.

EXAMPLE 2

Examination of Penetrability of Polymer Solid Electrolyte

Figure 2:
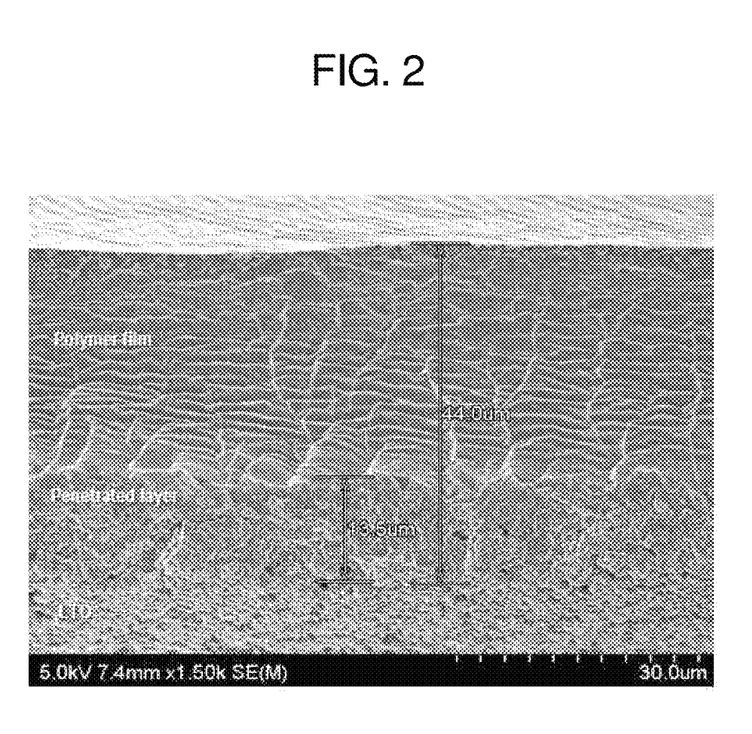
FIG. 2 is a SEM image showing the cross-section of the interface between the electrode and electrolyte of a hybrid supercapacitor obtained after by allowing a monomer solution before polymerization of a polymer electrolyte according to one embodiment of the present disclosure to penetrate into an electrode, and then curing the monomer solution.

FIG. 2 shows a SEM image of the interface at the interface between the electrode and electrolyte of a hybrid capacitor as a polymer film fabricated according to the process shown in FIG. 1 using, as the electrode, an LTO material that may be used for a supercapacitor. Referring to FIG. 2, it was confirmed that the monomer solution penetrated the LTO electrode layer having pores therein to form a penetrated layer, and then a cured layer (13.5 μm) was formed. This is a result showing that the method of the present disclosure is a process method capable of reducing the interface resistance between the electrode and the electrolyte. In addition, it could be confirmed that the polymer electrolyte cured without penetrating into the LTO layer formed an about 44 μm-thick electrolyte layer as a polymer film, suggesting that the polymer electrolyte can function as an electrolyte for a hybrid capacitor.

EXAMPLE 3

Measurement of Ionic Conductivity of Polymer Electrolyte

Figure 5:
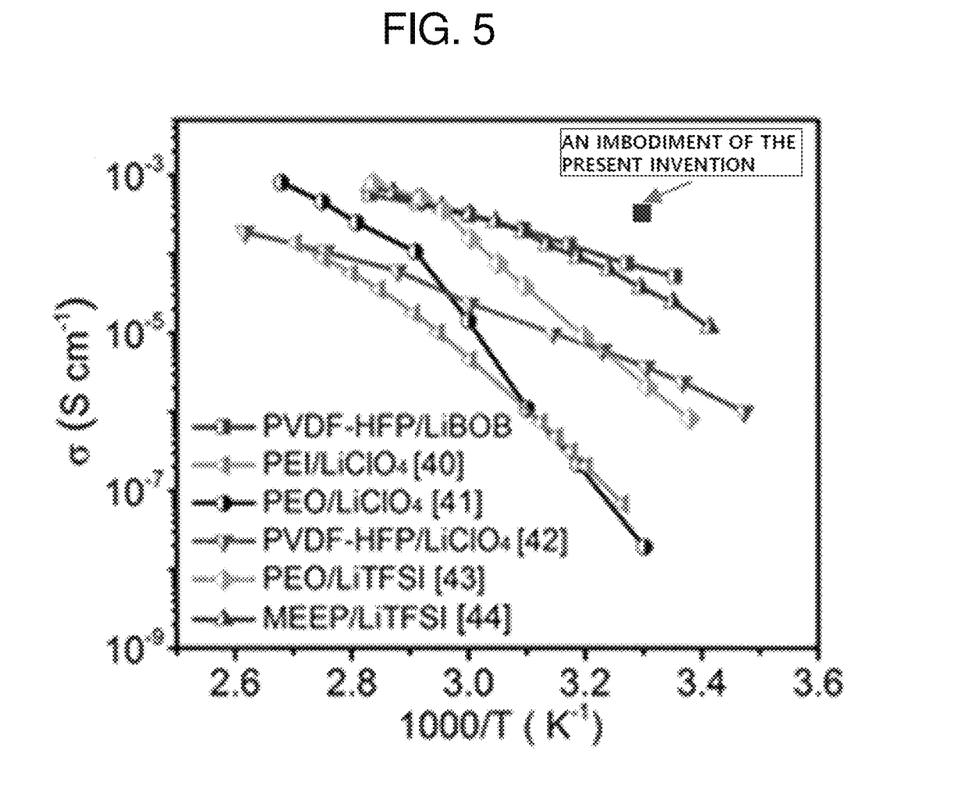
FIG. 5 is a graph showing the ionic conductivity of a polymer electrolyte according to one embodiment of the present disclosure.
Figure 6:
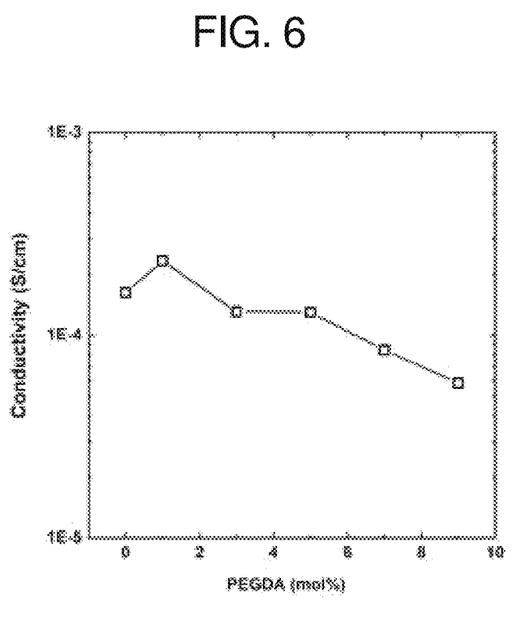
FIG. 6 is a graph showing the ionic conductivity depending on polymerizable comonomer content of a polymer electrolyte according to one embodiment of the present disclosure.

The ionic conductivities of the polymer electrolytes produced in the same manner as in Example 1 were measured. The results of measuring the compositions and ionic conductivities of the polymer electrolytes are shown in Tables 1 to 8 below. In addition, FIG. 5 is a graph showing the ionic conductivity of the polymer electrolyte according to one embodiment of the present disclosure, and FIG. 6 is a graph showing the ionic conductivity depending on polymerizable comonomer content of the polymer electrolyte according to one embodiment of the present disclosure.

TABLE 1

| MPC (mol %) | EMITFSI (mol %) | Conductivity (S/cm) |
| --- | --- | --- |
| 35 | 65 | $4.75 \times 10^{-4}$ |

TABLE 2

| SBMA (mol %) | BMIBF$_4$ (mol %) | Conductivity (S/cm) |
| --- | --- | --- |
| 22 | 78 | $2.63 \times 10^{-4}$ |

Referring to Tables 1 and 2 above, the polymer electrolytes obtained by mixing the ion conductive monomer and the ionic liquid showed ionic conductivities of $4.75 \times 10^{-4}$ S/cm and $2.63 \times 10^{-4}$ S/cm, respectively. The use of the ion conductive monomer makes it possible to obtain a polymer electrolyte having an excellent level of ionic conductivity.

Table 3 below shows the ionic conductivities of polymer electrolytes obtained by adding MPC as an ion conductive monomer, PEGDA as a polymerizable comonomer and EMITFSI as an ionic salt while using the acrylate-based polymerizable comonomer based on the data of Table 1 above.

TABLE 3

| MPC (mol %) | PEGDA (mol %) | EMITFSI (mol %) | Conductivity (S/cm) |
| --- | --- | --- | --- |
| 34.5 | 0.5 | 65 | $5.43 \times 10^{-4}$ |
| 34 | 1.5 | 64.5 | $3.69 \times 10^{-4}$ |
| 33.5 | 2.5 | 64 | $1.33 \times 10^{-4}$ |
| 33 | 4 | 63 | $1.00 \times 10^{-4}$ |
| 33 | 5 | 62 | $7.00 \times 10^{-5}$ |
| 31 | 10 | 59 | $2.79 \times 10^{-5}$ |

TABLE 3-continued

| MPC (mol %) | PEGDA (mol %) | EMITFSI (mol %) | Conductivity (S/cm) |
|---|---|---|---|
| 29 | 15 | 55 | $2.71 \times 10^{-5}$ |
| 28 | 20 | 52 | $1.86 \times 10^{-5}$ |

Referring to Table 3 above, the polymer electrolytes produced using the compositions comprising the polymerizable comonomer show an ionic conductivity of about $10^{-5}$ to $10^{-4}$ S/cm. It can be seen that the use of the ion conductive monomer makes it possible to ensure a commercially applicable level of ionic conductivity suitable for a polymer electrolyte, and mechanical properties can also be ensured by additionally comprising the polymerizable comonomer.

Table 4 below shows the ionic conductivity of a polymer electrolyte obtained by using SBMA as an ion conductive monomer, PEG as an additive, PEGDA as a polymerizable comonomer, and $BMIBF_4$, based on the data of Table 3 above.

TABLE 4

| SBMA (mol %) | PEG (mol %) | PEGDA (mol %) | $BMIBF_4$ (mol %) | conductivity (S/cm) |
|---|---|---|---|---|
| 16 | 23 | 1 | 60 | $4.99 \times 10^{-4}$ |

Referring to Table 4 above, the polymer electrolyte comprising the additive showed an ionic conductivity of $4.99 \times 10^{-4}$ S/cm. From this result, it can be seen that, when the additive is comprised, it is possible to ensure a commercially applicable level of ionic conductivity even at a relatively low ionic liquid content, and thus the content of the ionic liquid may further be reduced, thereby preventing the problem that leakage occurs, or a film is not formed, or solidification is not achieved.

Tables 5 to 7 below show the results of measuring the ion conductivities of polymer electrolytes further comprising an alkali metal salt. Specifically, Table 5 shows the ionic conductivity of a polymer electrolyte obtained by adding SBMA+$BMIBF_4$+acrylate+LiTFSI, Table 6 shows the ionic conductivity of a polymer electrolyte obtained by adding $LiPF_6$ instead of LiTFSI in the same composition above, and Table 7 shows the ionic conductivities of polymer electrolytes depending on the molecular weight of the polymerizable comonomer PEGDA.

TABLE 5

| SBMA (mol %) | $BMIBF_4$ (mol %) | PEGDA (mol %) | LiTFSI (mol %) | Conductivity (S/cm) |
|---|---|---|---|---|
| 12 | 58 | 19 | 11 | $1.84 \times 10^{-4}$ |

| SBMA (mol %) | $BMIBF_4$ (mol %) | TMPEOTA (mol %) | LiTFSI (mol %) | Conductivity (S/cm) |
|---|---|---|---|---|
| 10 | 46 | 35 | 9 | $1.65 \times 10^{-4}$ |

TABLE 6

| SBMA (mol %) | $BMIBF_4$ (mol %) | PEGDA (mol %) | $LiPF_6$ (mol %) | Conductivity (S/cm) |
|---|---|---|---|---|
| 11 | 53 | 17 | 19 | $3.69 \times 10^{-5}$ |

TABLE 7

Ionic conductivities of polymer electrolytes depending on molecular weight of PEGDA

| PEGDA molecular weight | SBMA (mol %) | $BMIBF_4$ (mol %) | PEGDA (mol %) | LiTFSI (mol %) | Conductivity (S/cm) |
|---|---|---|---|---|---|
| 250 | 9 | 43 | 39 | 9 | $1.46 \times 10^{-4}$ |
| 550 | 11 | 55 | 23 | 11 | $1.58 \times 10^{-4}$ |
| 575 | 11 | 55 | 23 | 11 | $1.40 \times 10^{-4}$ |

Referring to Table 5 above, the electrolytes obtained by adding SBMA+$BMIBF_4$+acrylate+LiTFSI showed an ionic conductivity of up to $1.84 \times 10^{-4}$ S/cm, and referring to Table 6 above, the polymer obtained by adding $LiPF_6$ instead of LiTFSI in the same composition showed an ionic conductivity of about $10^{-5}$ S/cm. In addition, referring to Table 7 above, the polymer electrolytes produced using PEGDAs having different molecular weight showed an ionic conductivity of about $10^{-5}$ to $10^{-4}$ S/cm. Thereby, it can be seen that, even if the lithium salt is added, a commercially applicable level of ionic conductivity can be obtained, and the polymer electrolyte can be used in a lithium-ion battery.

Table 8 below shows the ionic conductivity of a polymer electrolyte produced using PEGDME and SN as additives instead of an ionic liquid.

TABLE 8

| SBMA (mol %) | PEGDA (mol %) | PEGDME (mol %) | SN (mol %) | LiTFSI (mol %) | Conductivity (S/cm) |
|---|---|---|---|---|---|
| 2.5 | 56 | 14 | 2.8 | 24.7 | $1.07 \times 10^{-4}$ |

Referring to Table 8 above, it can be confirmed that, even when the polymer electrolyte was produced without using the ionic liquid, the ionic conductivity of the polymer electrolyte was increased up to $1.07 \times 10^{-4}$ S/cm, and a commercially applicable level of ionic conductivity could also be ensured.

COMPARATIVE EXAMPLE 1

Measurement of Ionic Conductivities of Polymer Electrolytes

The ionic conductivities of polymer electrolytes comprising no ion conductive monomer were measured, and Tables 9 to 11 below show the compositions and the results of measuring of ionic conductivities of the polymer electrolytes. Specifically, Table 9 below shows the results of measuring the ionic conductivity of the PEGDA polymer depending on the kind of Li salt, Table 10 below shows a tendency of ion conductivities depending on the mixing composition ratio between two different polymerizable comonomers (PEGDA and MPEGTA), and Table 11 below shows the ionic conductivity of a polymer electrolyte produced by adding two different polymerizable comonomers trimethylolpropane tris(3-mercaptopropionate) (TMPMP, thiol-based monomer) and PEGDA, LiTFSI, and PEGDME as an additive.

TABLE 9

| Li:EO mole ratio | Kind of Li salt | PEGDA (mol %) | Li salt (mol %) | Conductivity (S/cm) |
|---|---|---|---|---|
| 1:20 | LiTFSI | 70 | 30 | $2.43 \times 10^{-7}$ |
| 1:10 | LiI | 43.5 | 56.5 | $2.26 \times 10^{-8}$ |
| 1:15 | LiPF$_6$ | 43.5 | 56.5 | $6.05 \times 10^{-8}$ |

TABLE 10

| PEGDA:EO6TMPTA | PEGDA (mol %) | EO6TMPTA (mol %) | LiI (mol %) | Conductivity (S/cm) |
|---|---|---|---|---|
| 25:75 | 17 | 53 | 30 | $2.43 \times 10^{-7}$ |
| 50:50 | 35 | 35 | 30 | $2.26 \times 10^{-8}$ |
| 75:25 | 53 | 17 | 30 | $6.05 \times 10^{-8}$ |

TABLE 11

| TMPMP (mol %) | PEGDA (mol %) | PEGDME (mol %) | LiTFSI (mol %) | Conductivity (S/cm) |
|---|---|---|---|---|
| 20.4 | 20.4 | 40.8 | 18.4 | $6.80 \times 10^{-5}$ |

Referring to Tables 9 and 10 above, it was confirmed that the ionic conductivity of the polymer electrolyte comprising no ion conductive monomer was about $10^{-7}$ to $10^{-8}$ S/cm, and even when the two different polymerizable comonomers were crosslink-polymerized, a commercially applicable level of ionic conductivity could not be ensured. In addition, referring to Table 11 above, the polymer electrolyte produced by adding the additive showed an ionic conductivity of up to $6.8 \times 10^{-5}$ S/cm, which is lower than the ionic conductivity of the polymer electrolyte comprising the ion conductive monomer, since the polymer electrolyte did not comprise the ion conductive monomer.

For measurement of the ionic conductivity, coin cell was assembled by putting stainless steel SUS over both sides of the solid electrolyte, and the bulk resistance of the solid electrolyte was measured using an AC impedance meter at a frequency of 1 MHz to 100 MHz at room temperature (25° C.). The ionic conductivity was calculated using the following equation:

$$\sigma = \frac{l}{RA}$$

wherein l denotes the thickness (cm) of the solid electrolyte, R denotes the bulk resistance (ohm) of the solid electrolyte, and A denotes the cross-sectional area (cm$^2$) of the solid electrolyte.

EXAMPLE 4

Analysis of Voltage Stability of Polymer Electrolyte

Figure 7:
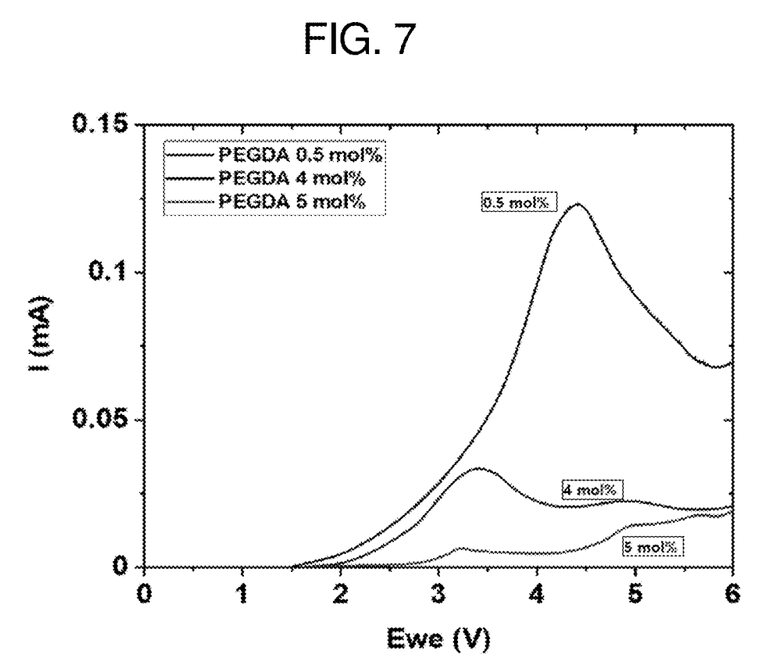
FIG. 7 shows data indicating the potential window of a polymer electrolyte according to one embodiment of the present disclosure.

The voltage stabilities of the polymer electrolytes produced in the Examples above were measured, and the results of the measurement are shown in FIG. 7. As shown in Table 7, it could be confirmed that, among the polymer electrolytes produced in Example 3, the electrolyte corresponding to Table 2 above had voltage stability corresponding to a wide potential window of about 3.0 V.

As described above, the polymer electrolyte according to one embodiment of the present disclosure may have increased ionic conductivity by comprising the ion conductive monomer, and may solve the interface resistance problem of a fabricated electrode due to improved ability to penetrate into a porous electrode material.

In addition, water electrolysis occurs at 1.24 V or higher. For this reason, if an electrolyte which is a component of a supercapacitor or a secondary battery comprises water or an electrolyte using a hydrophilic solvent is used, operation at high voltage may be impossible. On the other hand, when the polymer electrolyte according to one embodiment of the present disclosure is used, it may have a wide potential window of 1.24 V or higher. Accordingly, a supercapacitor or secondary battery comprising the polymer electrolyte of the present disclosure may have a wide potential window, and thus have a larger capacity.

Furthermore, according to one embodiment of the present disclosure, it is possible to ensure a process cost reduction technology for realizing a non-solvent system.

The polymer electrolyte according to one embodiment of the present disclosure may have excellent flexibility and stretchability, and may also have high ionic conductivity.

Since the polymer electrolyte according to one embodiment of the present disclosure is produced through cross-linking polymerization, it may be used for an electrode having a complex structure, and leakage of the electrolyte may be prevented. Meanwhile, the viscosity of the polymer electrolyte may be controlled by controlling the content of the ionic liquid.

That is, if the viscosity of the electrolyte is high, the risk of leakage of the electrolyte from a fabricated capacitor or secondary battery cell may be reduced, and if the viscosity of the electrolyte is low, the electrolyte may easily penetrate into a porous electrode material, so that the interfacial resistance in the cell may be reduced. Therefore, when the content of the ionic liquid in the polymer electrolyte developed in the present disclosure is controlled, the electrolyte can penetrate compactly into the porous electrode in addition to the effect of preventing electroltye leakage. In addition, when the viscosity of the electrolyte is controlled to a suitable level, the electrolyte may be prepared as an electrolyte ink for 3D printing, and may be injected according to a complex shape of a patterned electrode during a printing process. Accordingly, ultimately, it may be possible to fabricate a supercapacitor or a secondary battery through an all-printing process.

According to another embodiment of the present disclosure, the polymer electrolyte has excellent thermal stability, and thus the operable temperature range thereof may be wider than that of an electrolyte using an organic solvent or water as a solvent.

It should be understood that the effects of the present disclosure are not limited to the above-described effects and comprise all effects that can be deduced from the configuration of the disclosure described in the detailed description or claims of the present disclosure.

What is claimed is:

1. A composition for a polymer electrolyte comprising:
2.5 mol % to 12 mol % of an ion conductive monomer; wherein the ion conductive monomer is sulfobetaine methacrylate (SBMA) or 2-methacryloyloxyethyl phosphorylcholine (MPC),
17 mol % to 40 mol % of a polymerizable comonomer comprising a poly(ethylene glycol) diacrylate-based comonomer, a poly(ethylene glycol) triacrylate-based comonomer, a difunctional thiol-terminated polythioether comonomer, a trifunctional thiol-terminated polythioether comonomer, or a combination of two or more thereof, and 25 mol % to 60 mol % of an ionic liquid with respect to 100 mol % of the composition for a polymer electrolyte.

2. The composition for a polymer electrolyte of claim 1, wherein the polymerizable comonomer comprises a poly(ethylene glycol) diacrylate-based comonomer represented by the following Formula 3, a poly(ethylene glycol) triacrylate-based comonomer represented by the following Formula 4, a thiol-terminated polythioether comonomer represented by the following Formula 5, or a combination of two or more thereof:

wherein n in Formula 3 or 4 is an integer of 1 or more.

3. The composition for a polymer electrolyte of claim 2, wherein n in Formula 3 is an integer ranging from 2 to 15, and n in Formula 4 is an integer ranging from 1 to 10.

4. The composition for a polymer electrolyte of claim 1, wherein the ionic liquid comprises:

an anionic liquid selected from the group consisting of trifluoroacetate ([tfa]$^-$), trifluoromethanesulfonate ([CF$_3$SO$_3$]$^-$), bis(fluorosulfonyl)imide ([N(SO$_2$F)$_2$]$^-$), bis(trifluoromethylsulfonyl)imide ([N(SO$_2$CF$_3$)$_2$]$^-$), dicyanamide ([N(CN)$_2$]$^-$), tetracyanoborate ([B(CN)$_4$]$^-$), dihydrogen phosphate ([H$_2$PO$_4$]$^-$), hydrogen sulfate [HSO$_4$]$^-$), and combinations thereof, or a cationic liquid selected from the group consisting of imidazolium, pyrrolidinium, piperidinium alkylmethylimidazolium, and combinations thereof, or a neutral liquid selected from the group consisting of 1-ethyl-3-methylimidazolium bis(trifluoromethylsulfonyl)imide (EMITFSI), 1-methyl-3-propylimidazolium iodide (PMII), 1-ethyl-3-methylimidazolium tetrafluoroborate (EMIBF$_4$), 1-ethyl-3-methylimidazolium trifluoromethanesulfonate (EMITf), 1-ethyl-3-methylimidazolium hydrogen sulfate (EMIHSO$_4$), 1-ethyl-3-methylimidazolium trifluoromethanesulfonate (EMITf), N-methyl-N-butylpyrrolidinium bis(trifluoromethanesulfonyl)imide (PYRTFSI), and combinations thereof.

5. The composition for a polymer electrolyte of claim 1, further comprising 7 mol % s to 25 mol % of an alkali metal salt.

6. The composition for a polymer electrolyte of claim 5, comprising 9 mol % to 11 mol % of the alkali metal salt.

7. The composition for a polymer electrolyte of claim 5, wherein the alkali metal salt may comprise LiPF$_6$, LiBF$_4$, LiSbF$_6$, LiAsF$_6$, LiN(SO$_3$C$_2$F$_5$)$_2$, LiC$_4$F$_9$SO$_3$, LiClO$_4$, LiA$_1$O$_2$, LiAlCl$_4$, LiN(C$_x$F$_{2x+1}$SO$_2$)(C$_y$F$_{2y+1}$SO$_2$) (where x and y are each a natural number), LiCl, LiI, LiB(C$_2$O$_4$)$_2$ (lithium bisoxalatoborate, LiBOB), lithium bis(trifluoromethanesulfonyl)imide (LiTFSI), lithium bis(fluorosulfonyl)imide (LiFSI), NaSCN, NaSO$_3$CF$_3$, KTFSI, NaTFSI, or a combination of two or more thereof.

8. A polymer electrolyte comprising a product of crosslinking polymerization of the composition for a polymer electrolyte according to claim 1.

9. The polymer electrolyte of claim 8, wherein the product of crosslinking polymerization has an ionic conductivity of 3.69×10$^{-5}$ S/cm to 40×10$^{-1}$ S/cm.

10. An electronic device comprising the polymer electrolyte of claim 8, the electronic device being a supercapacitor, a lithium secondary battery, or an alkaline battery.

11. A composition for a polymer electrolyte comprising:

22 mol % to 35 mol % of an ion conductive monomer, wherein the ion conductive monomer is sulfobetaine methacrylate (SBMA) or 2-methacryloyloxyethyl phosphorylcholine (MPC);

63 mol % to 78 mol % of an ionic liquid; and 0.5 mole % to 5 mol % of a multi-functional polymerizable comonomer selected from a diacrylate-based comonomer, a triacrylate-based comonomer, a bifunctional thiol-terminated comonomer, a trifunctional thiol-terminated polythioether comonomer, or a combination of two or more thereof.

12. A polymer electrolyte comprising a product of crosslinking polymerization of the composition for a polymer electrolyte according to claim 11, wherein the product has an ionic conductivity of 1.0×10$^{-4}$ S/cm to 5.43×10$^{-4}$ S/cm.

13. A method for producing a polymer electrolyte, the method comprising a step of subjecting the composition for a polymer electrolyte of claim 1 to solvent-free crosslinking polymerization reaction using 3D printing.

14. The method of claim 13, wherein the step of subjecting the composition for a polymer electrolyte to solvent-free crosslinking polymerization reaction using 3D printer is crosslinking polymerizing by penetrating the composition for a polymer electrolyte into a porous electrode material.

* * * * *